United States Patent [19]

Tooley et al.

[11] Patent Number: 5,024,683
[45] Date of Patent: Jun. 18, 1991

[54] SORPTION OF TRIALKYL ARSINES

[75] Inventors: Patricia A. Tooley, Camden, Tenn.; Tin-Tack P. Cheung, Bartlesville, Okla.; Ted H. Cymbaluk, Bartlesville, Okla.; Gerhard P. Nowack, Bartlesville, Okla.; Marvin M. Johnson, Bartlesville, Okla.

[73] Assignee: Phillips Petroleum Company, Bartlesville, Okla.

[21] Appl. No.: 537,320

[22] Filed: Jun. 12, 1990

[51] Int. Cl.$^5$ .............................................. B01D 53/04
[52] U.S. Cl. ............................................. 55/74; 55/72
[58] Field of Search ...................................... 55/72, 74

[56] References Cited

U.S. PATENT DOCUMENTS

| 2,954,339 | 9/1960 | Beavon | 208/216 |
| 3,754,050 | 8/1973 | Duyverman et al. | 55/74 X |
| 3,804,750 | 4/1974 | Myers et al. | 208/253 |
| 3,876,533 | 4/1975 | Myers | 208/251 H |
| 4,046,674 | 9/1977 | Young | 208/251 H |
| 4,048,387 | 9/1977 | Lahme et al. | 429/50 |
| 4,094,777 | 6/1978 | Sugier et al. | 55/72 X |
| 4,101,631 | 7/1978 | Ambrosini et al. | 55/72 X |
| 4,462,896 | 7/1984 | Kitagawa et al. | 208/253 |
| 4,593,148 | 6/1986 | Johnson et al. | 585/823 |
| 4,744,221 | 5/1988 | Knollmueller | 55/74 X |
| 4,839,029 | 6/1989 | Ichikawa et al. | 208/251 R |
| 4,861,939 | 8/1989 | Debras et al. | 55/74 X |
| 4,902,662 | 2/1990 | Toulhoat et al. | 55/72 X |
| 4,933,159 | 6/1990 | Nowack et al. | 423/245.1 |
| 4,962,272 | 10/1990 | Cullo et al. | 55/74 X |

FOREIGN PATENT DOCUMENTS

| 169680 | 4/1985 | Japan . | |
| 7613998 | 6/1977 | Netherlands | 55/72 |

Primary Examiner—Robert Spitzer
Attorney, Agent, or Firm—K. K. Brandes

[57] ABSTRACT

Trialky arsine(s) are removed from a fluid (e.g., a hydrocarbon-containing gas) by contacting the fluid with a sorbent material comprising (a) copper sulfide, preferably copper(I) sulfide, and (b) an inorganic support material, preferably zinc oxide and/or alumina.

17 Claims, No Drawings

5,024,683

SORPTION OF TRIALKYL ARSINES

BACKGROUND OF THE INVENTION

This invention relates to the removal of trialkyl arsines from fluids by means of solid sorbents. In another aspect, this invention relates to the removal of trialkyl arsines from gases, in particular hydrocarbon-containing gases.

Materials for adsorbing and/or absorbing unsubstituted arsine ($AsH_3$) are well known. However, many of these materials are ineffective for the sorption of trialkyl arsines, which may be present as undesirable impurities in natural gas streams produced at some well sites. For instance, as is demonstrated by test data in this application, the CuO/ZnO-containing sorbent of U.S. Pat. No. 4,593,148 is effective for removing trialkyl arsines from a fluid feed only when the feed contains $H_2S$ (required by the claimed process of U.S. Pat. No. 4,593,148) which converts at least a portion of copper oxide to copper sulfide. The present invention provides a sorbent material which is effective for removing trialkyl arsines from fluids by sorption (i.e., adsorption and/or absorption), even from fluids which contain little or no $H_2S$.

SUMMARY OF THE INVENTION

It is an object of this invention to provide a process for removing trialkyl arsines from fluids. It is another object of this invention to provide a process for removing trialkyl arsines from gases, in particular hydrocarbon-containing gases. Other objects will become apparent from the detailed description of the invention and the appended claims.

In accordance with this invention, a process for at least partially removing trialkyl arsines from fluids (preferably gases) comprises the step of contacting a fluid feed which contains at least one trialkyl arsine with a solid sorbent material comprising (preferably consisting essentially of) (a) at least one copper sulfide (preferably copper(I) sulfide) and (b) an inorganic support material (preferably selected from the group consisting of alumina, fluorided alumina, aluminum phosphate, silica, aluminosilicates such as clays or zeolites, titania, zirconia, hafnia, zinc oxide, zinc aluminate, aluminates of metals of Group IIA of the Periodic Table [as defined on page 852 of Webster's New Collegiate Dictionary, 1977], zinc titanate, titanates of Group IIA metals, activated carbon, and mixtures of the above materials); wherein said contacting is carried out at such contacting conditions as to obtain a fluid product having a lower trialkyl arsine content than said feed (with the spent sorbent material containing the portion of trialkyl arsine which has been removed from the feed).

DETAILED DESCRIPTION OF THE INVENTION

The term "trialkyl arsine", as used herein, refers to compounds having the general chemical formula of $R_3As$, wherein each R is a radical independently selected from among alkyl groups (straight and/or branched), preferably having 1–6 (more preferably 1–3) carbon atoms. Particularly preferred trialkyl arsines are trimethyl arsine, triethyl arsine, dimethyl ethyl arsine and diethyl methyl arsine.

Any suitable liquid or gaseous fluid stream which contains trialkyl arsine(s) can be used as feed in the process of this invention. Preferably, the feed is gaseous. Non-limiting examples of suitable feeds are: natural gas; gaseous petroleum fractions comprising paraffins and olefins containing 1–6 carbon atoms per molecule; and gaseous products from thermal and catalytic cracking of petroleum, shale oil or coal. Generally, the gases comprise methane, ethane, ethylene, propane, propylene, n-butane, isobutane, butenes; and the like. These gas streams can contain other impurities, such as hydrogen sulfide, carbonyl sulfide (COS), mercaptans, organic sulfides, carbon monoxide, carbon dioxide, inert gases ($N_2$, He, Ne, Ar), and the like. However, the process of this invention is particularly effective when $H_2S$ is substantially absent or present only in trace amounts.

Other arsenic compounds may also be present in the fluid stream which is treated by the process of this invention, such as $AsH_3$, $RAsH_2$, $R_2AsH$, $R_3AsO$ (trialkyl arsine oxides), $R_3AsS$ (trialkyl arsine sulfides), and the like; wherein R is an alkyl group, as defined above. It is also possible to have triphenyl arsine, dialkyl phenyl arsines, dialkyl cycloalkyl arsines, and the like present in the feed. Preferably, free oxygen is substantially absent from the feed.

Generally, the total concentration of the trialkyl arsine(s) in the feed (preferably gaseous) is in the range of from about 1 ppb (1 part by weight of trialkyl arsine per billion parts by weight of feed) to about 0.1 weight—%, preferably about 0.01–10 ppm (parts by weight trialkyl arsine per million parts by weight of feed). The concentrations of the other impurities and the exact composition of the feed will widely vary from feedstock to feedstock.

The sorbent materials which are used in the process of this invention comprises copper sulfide and an inorganic support material. Preferably, the copper sulfide is substantially copper(I) sulfide. Generally the copper content in the sorbent is in the range of from about 1 to about 60, preferably from about 5 to about 30, weight—% Cu.

Any suitable, effective inorganic support material can be employed as component (b). Preferably, the support material is selected from the group consisting of alumina, fluorided alumina (i.e., alumina which has been treated with HF or $NH_4HF_2$ under such conditions as to incorporate fluoride ions into the crystal lattice of alumina), aluminum phosphate, silica, titania ($TiO_2$), zirconia ($ZrO_2$), hafnia ($HfO_2$), zinc oxide, zinc aluminate ($ZnAl_2O_4$) aluminates of Group IIA metals (i.e., of Be, Mg, Ca, Sr, Ba), zinc titanate ($Zn_2TiO_4$), titanates of Group IIA metals, activated carbon, and mixtures of two or more than two of the above materials. Presently more preferred support materials are zinc oxide or alumina or mixtures of alumina and zinc oxide.

In a preferred embodiment, a composition comprising CuO, ZnO and, optionally, $Al_2O_3$ (described in U.S. Pat. No. 4,593,148, wherein the preferred weight ratio of CuO:ZnO in the composition is about 1:3 to about 3:1, and the $Al_2O_3$ content can range from 0 to about 90 weight—%) is contacted with an $H_2S$-containing gas at such conditions as to convert a substantial portion of CuO to a sulfide of copper, in particular copper(I) sulfide (which may contain $S_x^{-2}$ anions). Preferably, the CuO/ZnO composition is treated with a gas mixture of $H_2S$ and $N_2$ at about 20°–30° C. until breakthrough of $H_2S$ occurs.

The sorbent particles can have any suitable surface area (such as about 10–500 m²/g, as measured by the B.E.T. method employing $N_2$), any suitable shape (such as spherical, cylindrical, ring-shaped, trilobal etc.), and any suitable size (such as about 0.2–20 mm diameter for spherical particles).

Any suitable contacting conditions can be employed in the sorption process of this invention. Generally the temperature in the contacting zone is in the range of from about $-20°$ to about $100°$ C., preferably about $20°$ to about $50°$ C. Generally the pressure in the contacting zone is in the range of from about 1 to about 500 atm., preferably about 1 to about 70 atm. Generally the gas hourly space velocity of the gaseous feed in the contacting zone is in the range of from about 10 to about 20,000 volume of feed/volume of sorbent/hour, preferably about 1,000 to about 10,000 volume/volume/hour, measured at about $25°$ C./1 atm. Generally the contacting is continued until trialkyl arsine breakthrough occurs, i.e., when the treated product contains more trialkyl arsines than can be tolerated, such as about 50 ppb.

Treatment of the feed streams in accordance with the process of this invention can be carried out in any suitable manner. For example, in a preferred embodiment a bed of the sorbent is placed as a fixed bed in a confined zone, and a fluid stream (preferably a gas) is passed therethrough in either upward or downward flow. Other suitable, yet less preferred methods of treatment can include a fluidized operation in which the feed and the sorbent particles are maintained in a state of turbulence under hindered settling conditions in a confined zone, moving bed operations in which the sorbent passes as a moving bed countercurrently to or concurrently with the feed, etc. In a fixed bed operation of a continuous process, the flow of fluid can be rotated between two or more sorbent beds with at least one being in regular operation, the other being in a regeneration mode. Continuous processes are preferred, but it is understood that batch type operations can be employed when desired.

It is within the scope of this invention to employ a combination of sorbents, such as a first bed (guard bed) of a supported CuO-ZnO material (described in U.S. Pat. No. 4,593,148) or $PbO/Al_2O_3$ for substantial removal of $AsH_3$ and/or $H_2S$ from the feed, and at least one subsequent downstream bed containing at least one of the sorbent materials of this invention for absorbing trialkyl arsines. This multi-bed operation can be carried out in one reactor containing a layer of the supported CuO-ZnO material or $PbO/Al_2O_3$ (or any other known sorbent for $AsH_3$ and $H_2S$) and a downstream layer of a trialkyl arsine sorbent of this invention. Or the multi-bed operation can be carried out using two (or more) separate sorption reactors: a first reactor containing the supported CuO-ZnO material or $PbO/Al_2O_3$ (or any other known sorbent for $AsH_3$ and $H_2S$) and a second reactor containing the trialkyl arsine sorbent of this invention, wherein the feed passes through the first reactor and thereafter through the second reactor.

The process of this invention will be further illustrated by the following non-limiting examples.

EXAMPLE I

This example illustrates the absorption of an alkyl arsine by two sorbent materials (described below).

A nitrogen gas stream was passed through a flask containing liquid trimethyl arsine (provided by Strem Chemicals, Inc.), which was cooled to about $-78°$ C. by placing the flask in a dry ice/acetone mixture. The gas stream, which contained $N_2$ and trimethyl arsine, was passed through a glass tube of about 7 mm diameter and about 12 cm length containing about 5 grams of one of the sorbents described below. The gas which exited from the absorption tube was passed through an aqueous solution of $KMnO_4$ and then to a flow meter. The flow rate of the gas was about 1800 cc/hour (equivalent to about 360 cc/cc sorbent/hour).

When trimethyl arsine breakthrough occurred (i.e., when the sorbent had reached its maximum arsine absorption capacity), the purple color of the $KMnO_4$ solution turned brownish. After arsine breakthrough had been detected, the flow of the trimethyl arsine containing gas stream was stopped, and a purge stream of pure nitrogen was passed through the sorbent material for about 15 hours so as to purge unabsorbed trimethyl arsine therefrom. The absorption tube containing the sorbent and absorbed trimethyl arsine was weighed. The difference between this weight and the initial weight of the tube with fresh sorbent was the weight of absorbed trimethyl arsine.

Two sorbent materials were tested: (A) 20–40 mesh $CuO/ZnO/Al_2O_3$, containing about 27–28 weight–% Cu and about 13 weight–% Zn, provided by BASF Corporation, Parsippany, NJ, under the product designation "R3-12"; and (B) the above $CuO/ZnO/Al_2O_3$ material which had been treated at room temperature with a gas stream of 4 weight–% $H_2S$ and 96 weight–% $N_2$ at an hourly space velocity of 1800 cc/cc sorbent/hour until $H_2S$ breakthrough occurred (after about 72 minutes). The copper component in Sorbent (B), which contained about 13 weight–% S (after purging with $N_2$), was present primarily in the $Cu^{+1}$ valence state (according to X-ray photoemission spectroscopy results).

Sorbent (A) absorbed no trimethyl arsine at all (at the absorption test conditions described above), whereas the sulfided sorbent (B) absorbed about 0.67 millimoles trimethyl arsine per gram sorbent. Thus, the copper sulfide containing sorbent material (B) is well suited as a trialkyl arsine sorbent for any gas feed (even one which does not contain $H_2S$), while sorbent (A) is effective only when the gas feed contains $H_2S$ which can sulfide CuO.

EXAMPLE II

The sulfided sorbent (B), described in Example I, was field-tested at a commercial natural gas compressor station near Roswell, NM. The natural gas contained about 0.5 ppm As, primarily as trimethyl arsine. The stainless steel absorption tubes used in these field tests had a diameter of 0.5 inch and 3 feet long, and contained about 70 cc (about 71 g) of the sorbent material. Treatment of the natural gas with sorbent (B) removed in excess of 99% of the trimethyl arsine present.

Reasonable variations and modifications which will be apparent to those skilled in the art, can be made within the scope of the disclosure and appended claims without departing from the scope of this invention.

That which is claimed is:

1. A process for at least partially removing trialkyl arsines from fluids comprising the step of contacting a fluid feed which contains at least one trialkyl arsine with a solid sorbent material comprising (a) at least one copper sulfide and (b) an inorganic support material; wherein said contacting is carried out at such contacting conditions as to obtain a fluid product having a lower trialkyl arsine content than said feed, and wherein hydrogen sulfide and free oxygen are substantially absent from said fluid feed.

2. A process in accordance with claim 1, wherein said fluid feed is a gas.

3. A process in accordance with claim 1, wherein said fluid feed is a hydrocarbon-containing gas.

4. A process in accordance with claim 1, wherein said trialkyl arsine has the chemical formula of $R_3As$ with each R being independently selected from the group consisting of alkyl groups containing 1–6 carbon atoms.

5. A process in accordance with claim 4, wherein said alkyl groups contain 1–3 carbon atoms.

6. A process in accordance with claim 1, wherein said fluid feed is a gas and said at least one trialkyl arsine is selected from the group consisting of trimethyl arsine, triethyl arsine, dimethyl ethyl arsine and diethyl methyl arsine.

7. A process in accordance with claim 1, wherein said fluid feed contains about 1 ppb to about 0.1 weight-% of said at least one trialkyl arsine.

8. A process in accordance with claim 1, wherein said fluid feed is a gas which contains about 0.01–10 ppm of said at least one trialkyl arsine.

9. A process in accordance with claim 1, wherein component (a) of said sorbent material is copper(I) sulfide.

10. A process in accordance with claim 9, wherein said sorbent material contains about 1–60 weight-% Cu.

11. A process in accordance with claim 1, wherein component (b) of said sorbent material is selected from the group consisting of alumina, fluorided alumina, aluminum phosphate, silica, aluminosilicates, titania, zirconia, hafnia, zinc oxide, zinc aluminate, aluminates of metals of Group IIA of the Periodic Table, zinc titanate, titanates of Group IIA metals, activated carbon, and mixtures thereof.

12. A process in accordance with claim 1, wherein said sorbent material comprises (a) copper(I) sulfide and (b) at least one of alumina and zinc oxide.

13. A process in accordance with claim 12, wherein said sorbent material contains about 5–30 weight-% Cu.

14. A process in accordance with claim 1, wherein said sorbent material has been prepared by treating a composition comprising copper oxide and zinc oxide with a $H_2S$-containing gas at about 20°–30° C. under such conditions as to convert a substantial portion of copper oxide to copper(I) sulfide.

15. A process in accordance with claim 14, wherein said composition, which is treated with the $H_2S$-containing gas, consists essentially of copper oxide and zinc oxide.

16. A process in accordance with claim 14, wherein said composition, which is treated with the $H_2S$-containing gas, consists essentially of copper oxide, zinc oxide and alumina.

17. A process in accordance with claim 14, wherein in said composition, which is treated with the $H_2S$-containing gas, the weight ratio of CuO:ZnO is about 1:3 to about 3:1.

* * * * *